Oct. 10, 1944.   S. SMITH ET AL   2,360,078
SEPARABLE ROLLER BEARING
Filed Aug. 26, 1943
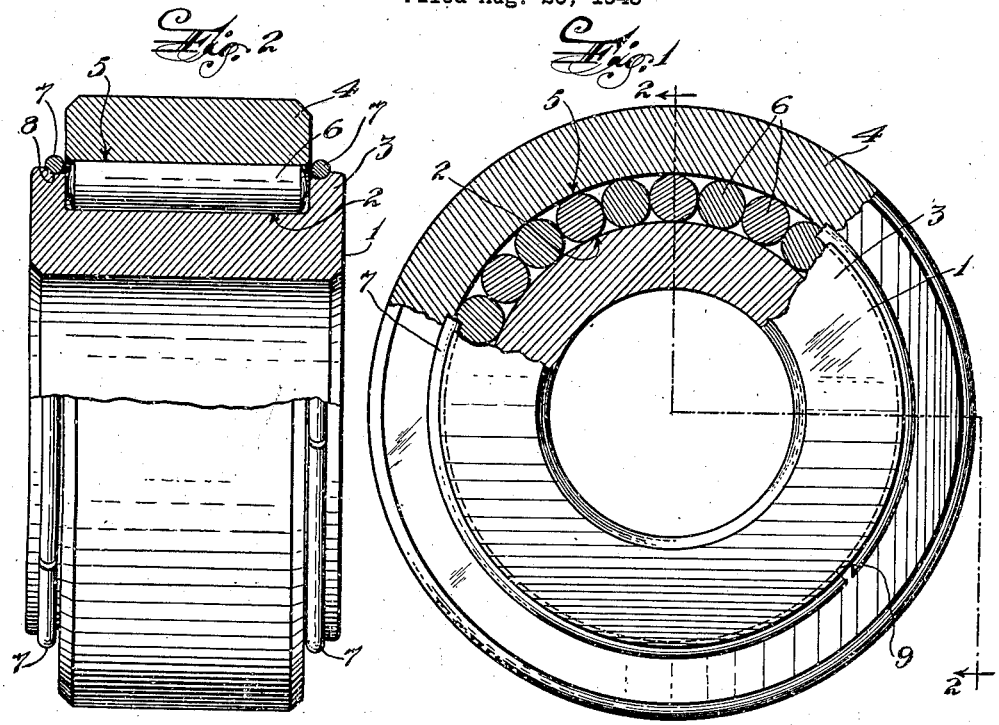
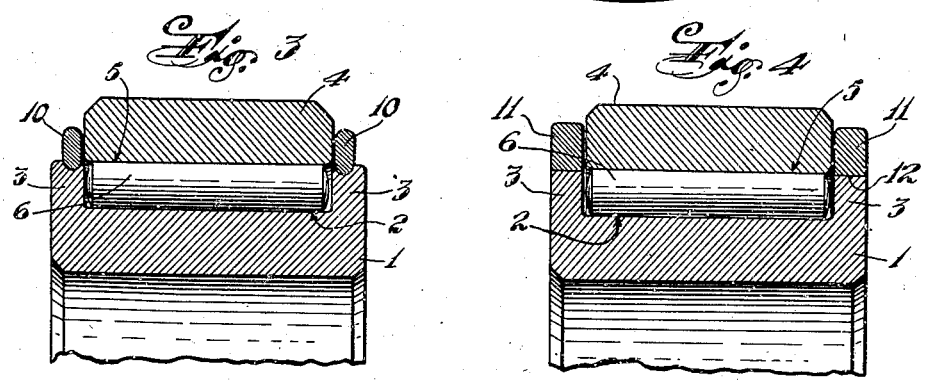
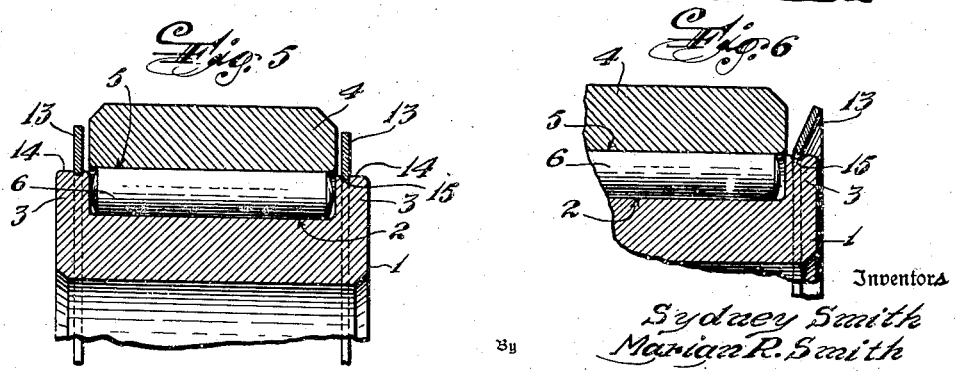
Inventors
Sydney Smith
Marian R. Smith
Harry B. Cook.
Attorney Patented Oct. 10, 1944

2,360,078

UNITED STATES PATENT OFFICE 2,360,078

SEPARABLE ROLLER BEARING

Sydney Smith and Marian R. Smith,
Trenton, N. J.

Application August 26, 1943, Serial No. 500,040

5 Claims. (Cl. 308—213)

This invention relates to roller bearings of the type that include an inner race ring and an outer race ring having rollers between them, and means for normally holding the race rings and rollers in proper relation to each other so that the assembled bearing can be handled as a unit without danger of unintended separation of the race rings and rollers. Bearings of this nature are now widely used, especially in aircraft.

Many known roller bearings of this character are constructed so that after once they have been assembled, the race rings and rollers cannot be separated without damaging the bearing. The construction of other known bearings of this type is such that it is an extremely difficult and time-consuming operation to disassemble the bearings. Moreover, some bearings of the general character described have thin, flat metal retainer rings secured on one or the other of the race rings to hold the rings and rollers in assembled relation to each other, the ends of the rollers frictionally abutting said retainer rings; and generally said retainer rings do not effectually withstand the end thrust and wear imposed thereon by the rollers and one of the race rings. Frequently the inner race ring is clamped at its ends on a shaft, and the clamping means sometimes presses the retainer rings inwardly so that an objectionably tight contact is made between the retainer rings and the ends of the outer race ring.

Therefore, a prime object of our invention is to provide a roller bearing of the type hereinbefore referred to which shall include novel and improved features of construction such that the two race rings and the rollers can be disassembled or separated from each other easily and quickly and without damage to any of them and the bearing shall effectually withstand end thrusts of the rollers and of the race rings and the friction and wear consequent thereto.

Another object is to provide such a roller bearing wherein the inner race ring shall have integral or relatively heavy end flanges which define a circumferential raceway for the rollers and will satisfactorily resist end thrusts of the rollers, and novel and improved means associated with said flanges for normally holding the two race rings together or against separation from each other but permitting separation of the race rings easily and quickly when desired.

Other objects are to provide a roller bearing of the character described wherein a minimum of friction between the retainer rings and the outer race ring shall be ensured; to provide a roller bearing the race rings and rollers of which can be assembled with a minimum of effort and manipulations and with a minimum expenditure of time; and to obtain other advantages and results as will be brought out by the following description in conjunction with the accompanying drawing in which Figure 1 is an end elevational view of a roller bearing embodying our invention, with portions broken away and shown in section.

Figure 2 is a vertical longitudinal sectional view on the line 2—2 of Figure 1.

Figure 3 is a fragmentary view similar to Figure 2 showing a modification of the invention.

Figure 4 is a view similar to Figure 3 illustrating another form of the invention.

Figure 5 is a view similar to Figure 3 showing a further modification of the roller bearing, and Figure 6 is a fragmentary, vertical, longitudinal sectional view through the form of bearing illustrated in Figure 5, and showing the manner of assembling the retainer ring on the inner race ring.

Specifically describing the invention, the roller bearing includes an inner race ring 1 which has a cylindrical raceway 2 and an integral coaxial roller retaining flange 3 at each end of the raceway.

An outer race ring 4 surrounds the inner race ring and has a cylindrical raceway 5 which extends through the ends of the ring and is of a diameter greater than the diameter of the outer peripheries of the flanges 3 of the inner race ring. As shown, the outer race ring is arranged with each end disposed inwardly of the corresponding flange 3.

Rollers 6 are arranged in the raceways and interposed between the race rings so that the ends of the rollers may have loose abutting contact with the inner sides of the roller retaining flanges 3.

Each flange 3 has means to form an abutment for the corresponding end of the outer race ring to prevent endwise displacement of the race rings relatively to each other and thereby hold the race rings and rollers in properly assembled relation. In general, said means comprises a retainer ring which is secured to the outer periphery of the corresponding roller retaining flange 3, and it is desirable that said retainer rings be separably connected to the inner race ring.

As shown in Figures 1 and 2, the retainer rings are designated 7 and comprise split spring rings of circular cross section, each retainer ring surrounding and being held by its inherent resiliency in contact with the outer periphery of the corresponding flange 3. Preferably the peripheral surface of each flange 3 has a circumferential groove 8 in which the corresponding retainer ring 7 is resiliently seated. The cross-sectional diameter of the retainer ring is such that the ring will span the gap between the corresponding end of the outer race ring and the outer peripheral surface of the corresponding flange 3 and thereby serve as an abutment for the corresponding end of the outer race ring.

With such a construction it will be observed that the bearing parts may be easily and quickly assembled by placing the rollers in the raceway 2, slipping the outer race ring over the rollers and snapping the split spring rings 7 into their respective grooves 8. To disassemble or take apart the bearing, it is simply necessary to spring off one of the retainer rings 7 as by inserting a tool between its ends, whereupon the outer race ring may be slipped endwise off the rollers and the inner race ring and the rollers can be removed.

As shown, the roll retaining flanges 3 may be relatively thick and rigid, as is desired, to withstand the end thrusts and frictional wear of the rollers, and the retainer rings 7, 10, 11 and 13 may be relatively thin because little or no thrust is imposed thereon. Accordingly the difficulty of properly applying and removing thick retaining flanges to and from the race ring is avoided and at the same time the assembly and disassembly of the bearing is facilitated by the relatively thin, easily and quickly applicable and removable, resilient retainer rings.

If desired, one or both ends of each retainer ring 7 may have a notch 9 or other suitable means for engagement with a tool to facilitate springing apart of the ends of the ring for removal of the ring.

Figure 3 shows a similar construction, the only difference being that in Figure 3 the split ring retainer ring 10 is elongate in cross section instead of circular.

Figure 4 shows another modification wherein each retainer ring 11 is a continuous and unsplit ring, and the ring is shrunk on the outer peripheral surface 12 of the corresponding roller retaining flange 3 of the inner race ring. For example the retainer ring 11 may be formed so that its interior periphery is of a diameter slightly less than the diameter of the peripheral surface 12 of the flange 3. The ring may then be heated to expand it, after which the ring may be slipped over the flange 3 and cooled. Upon cooling, the retainer ring will contract into tight contact with the peripheral surface 12 of the roller retaining flange.

Figures 5 and 6 show another modification of the invention wherein the retainer ring 13 is first made of conical form with its inner diameter approximately equal to the diameter of the outer peripheral surface 14 of the roller retaining flange 3. The retainer ring 13 is slipped over the flange 3 as shown in Figure 6 and thereafter pressed into a flat plane as shown in Figure 5, the inner periphery of the ring thus being forced into tight contact with the flange 3. If desired, the flange 3 may have a circumferential groove 15 in which the ring 13 may seat.

It will be understood that instead of using a retainer ring on each roller retaining flange, one of the flanges might be made of sufficient diameter to serve as an abutment for the corresponding end of the outer race ring. It is desirable, however, that two retainer rings be utilized, and that said retainer ring be formed of some material such as hard rolled bronze to avoid the steel to steel contact that would be incident to making the roller retaining flange of such size as to form an abutment for the outer race ring.

It will also be understood that if desired the roller retaining flanges could be formed on the outer race ring instead of on the inner race ring as shown in the drawing. The structure would be substantially the same, except that the retainer rings would abut the ends of the inner race ring instead of the ends of the outer race ring.

Other modifications and changes in the details of construction of the bearing will occur to those skilled in the art as within the spirit and scope of the invention.

What we claim is:

1. A roller bearing comprising an inner race ring having a raceway and coaxial roller retaining flanges integral with said race ring at opposite ends thereof, an outer race ring surrounding said inner race ring, said outer race ring having a cylindrical raceway opening through the ends thereof, rollers in said raceways and interposed between said race rings so that the ends of said rollers may have loose abutting contact with said flanges upon endwise movement of the rollers, said flanges being relatively thick to withstand end thrusts and frictional wear of said rollers, each said flange having means to abut the corresponding end of said outer race ring for holding the race rings against endwise displacement relatively to each other, said means for at least one of said flanges comprising a ring secured to the outer periphery of said flange.

2. The roller bearing set forth in claim 1 wherein at least said one of said flanges has a circumferential groove in the outer peripheral surface thereof and said ring is a relatively thin split spring ring resiliently seated in said groove and forming an abutment for the corresponding end of said outer race ring.

3. A roller bearing comprising an inner race ring having a raceway and an integral coaxial roller retaining flange at each end thereof, an outer race ring having a raceway extending through the ends of said ring and of a diameter greater than the diameter of the outer peripheries of said flanges, said outer race ring surrounding the inner race ring with each end disposed inwardly of the corresponding said flange, rollers in said raceways and interposed between said race ring so that the ends of said rollers may have loose abutting contact with said flanges upon endwise movement of the rollers, said flanges being relatively thick to withstand end thrusts and frictional wear of said rollers, and a ring secured to said outer periphery of each said flange and forming an abutment for the corresponding end of said outer race ring for holding said race rings in said relation to each other.

4. The roller bearing set forth in claim 3 wherein said retainer rings are hard rolled bronze shrunk on the outer peripheral surfaces of the corresponding flanges.

5. The roller bearing set forth in claim 1 wherein said ring has an elongate cross section in the plane of the ring so that the sides of the ring contact the end surfaces of the outer race ring.

SYDNEY SMITH.
MARIAN R. SMITH.